2,975,059
DRY COOKIE MIX

John S. Andrews, St. Paul, Minn., assignor to General Mills, Inc., a corporation of Delaware No Drawing. Filed Jan. 28, 1955, Ser. No. 484,838

2 Claims. (Cl. 99—94)

The present invention relates to a baking mix of the type including discrete particles of chocolate commonly referred to as chocolate chips or chocolate nibs, which mix is intended to be baked to form a baked product in which the chocolate particles are still present as discrete particles and in which the chocolate has not diffused to any great extent.

Baked products in which discrete chocolate particles are present, such as chocolate chip cookies, are commonly made in the home from the usual ingredients of a batter, such as flour, shortening, eggs, minor ingredients and liquid by adding separate and distinct chocolate particles such as chocolate nibs. Under ordinary circumstances in the home this presents no particular problem since the chocolate nibs are added after the dough has been prepared and the nibs are exposed to a minimum of mixing. When, however, one attempts to make a prepared baking mix containing the chocolate nibs, and when this mix is distributed through the normal channels of commerce, certain difficulties are encountered. For example, prepared mixes of this type are ordinarily distributed without refrigeration and in the warmer seasons of the year the ordinary room temperature may be sufficiently high to soften the nibs in the mix. If the nibs become softened due to an elevated room temperature they will remain soft for a considerable period of time since they are well insulated in the mix package. Accordingly, when a batter is made from such a mix in which the nibs are soft, the beating or whipping involved in the preparation of the batter is sufficient to break up the nibs and disperse them throughout the batter to produce a chocolate type batter without any separate or distinct chocolate particles.

It has not been found possible, therefore, to prepare a satisfactory dry baking mix containing chocolate nibs by employing the ordinary chocolate nibs which are employed for this purpose in home baking. It has now been found, however, that it is possible to apply a carbohydrate coating to the nibs which will protect the nibs against disintegration during the batter making operation, notwithstanding the fact that the nibs may be at an elevated room temperature sufficient to render the chocolate within the nib soft or plastic.

It is, therefore, the object of the present invention to provide a dry prepared baking mix which contains, in addition to the usual baking ingredients, chocolate particles or nibs having a carbohydrate coating which is resistant to disintegration during the batter-making operation and which will protect the nibs during the preparation of the batter, notwithstanding the fact that the nibs may be at a sufficiently high temperature to render the chocolate soft or plastic.

The invention is adapted to dry baking mixes in general. These may be dry cake mixes composed of flour, shortening, sugar, and the usual minor ingredients—the entire mix being in the form of a dry, free-flowing product. The invention is also applicable to other mixes, such as cookie mixes which may contain similar ingredients to the cake mix, but in which the shortening is so thoroughly distributed on the flour that the product is no longer free-flowing, but is in the form of a solid block. The invention is also applicable to other prepared baking mixes in which it is desired to have present in a finished baked product, discrete chocolate particles distributed through the baked product without any substantial diffusion of the chocolate throughout the baked product.

A wide variety of coatings may be employed to attain this result. They are all essentially carbohydrate and preferably are composed of sugars. A preferred sugar for the preparation of the coating is ordinary table sugar, or sucrose. This sugar alone, however, tends to crystallize to a brittle, coarse form which permits easy access of moisture to the interior of the coating and also tends to shatter when subjected to mechanical shock. Accordingly, it is preferred to employ with sucrose, an added material which has a plasticizing or toughening effect upon the sugar coating. Suitable added materials include invert sugar, dextrose, fructose, starch hydrolysis products, pectin, gums such as karaya, tragacanth, mannogalactans such as locust bean and guar, and similar carbohydrate materials which tend to form continuous tough films. These may be used with the sugars in the desired proportion to obtain the requisite mechanical strength and the other necessary properties. The coating must be one which does not liquefy in the batter-making operation and which does not shatter. At the same time the coating should be sufficiently thin that when the baked product is eaten, the presence of the coating is not readily detectable and the pleasant eating sensation obtained with ordinary home baked products of the same nature is experienced. The quantity of coating suitable for this purpose usually varies within the range from 20 to 40% by weight, based on the total weight of nibs.

A suitable way of detecting the acceptability of a particular coating for the nibs is to prepare a light colored baking mix containing the coated nibs, and to store the baking mix at approximately 100° F. for a long enough period of time for the mix to actually reach that temperature. The mix is cooled to 85° F. and the batter is prepared at this temperature using water and whole egg at 72° F. The water and egg are blended in and the batter is mixed fifty strokes with a wooden spoon. The acceptability of the coating is determined by observing the discoloration of the batter due to disintegration of the nibs and diffusion of the chocolate throughout the batter. If the batter remains light in color with substantially no coloration due to diffusion, the coating is suitable. Obviously some diffusion of chocolate through the batter may be tolerated as long as the final product retains distinct chocolate particles distributed through a matrix which is essentially free from chocolate or at least contains such a small quantity of chocolate that the taste and appearance of chocolate are not perceptible.

Example

A solution was prepared from the following ingredients: 0.25 lb. of gum arabic, 1.25 lbs. of sucrose, 1.50 lbs. of corn syrup, 2.40 lbs. of water.

Twelve lbs. of chocolate nibs together with one-half lb. of sugar were placed in a rotating coating pan. Sixteen ml. of the above gum solution were then added to the dry ingredients in the revolving pan. Thereafter 1½ lbs. of sugar were added slowly. The drum was continuously rotated until the coating on the chocolate nibs was fairly well dried. Sixteen ml. of gum solution were then added and another 1½ lbs. of sugar were slowly sprinkled in. The drum was rotated until this coating again became fairly dry. Sixteen ml. of a caramel colored solution were then added and finally ½ lb. of sugar was added and pan rotated until the coating became dry.

These coated nibs were included in a dry cookie mix at a ratio of 9 parts of base cookie mix and 5 parts of coated nibs. The cookie mix was then stored at 100° F. until all the ingredients had reached this temperature. The temperature of the mix was then reduced to 85° F. and to 14 oz. of complete chocolate chip cookie mix, one teaspoon of water and one egg at room temperature (approximately 72° F.) were then blended and mixed 50 strokes with a wooden spoon.

The color of the batter was compared with the color of a batter prepared from the same mix containing no chocolate nibs. It was found that the batter containing the nibs had only a very slight discoloration as compared with the batter containing no nibs, indicating that notwithstanding the fact that the chocolate within the nibs was soft and plastic, the coating was sufficiently rigid so that the nibs were not broken down appreciably during the mixing operation. Similar treatment of a mix containing uncoated nibs resulted in excessive smearing of nibs throughout the batter.

The batter containing the coated nibs was baked to yield cookies in which the chocolate nibs were separate and distinct from the remainder of the cookie and were readily identifiable in the cookie. Moreover, when these cookies were eaten there was no perceptible difference in the eating qualities due to the coating on the nibs. The product prepared from uncoated nibs was practically a chocolate cookie.

In place of the coating referred to in the above example it is possible to prepare coatings composed of the following ingredients: guar pectin, free gelatinized starch, gum arabic, gum karaya, alginates and dextrins. These materials may be used alone or in combination and also may be used in combination with various sugars. These materials make possible the production of a coating which has the requisite mechanical properties to permit its use in place of the coating described in detail in the example.

Now, therefore, I claim:

1. A dry cookie mix comprising flour, shortening, sugar and discrete chocolate particles, the shortening being thoroughly smeared on the flour and the mix being impressed in the form of a solid block, the chocolate particles having a sugar coating which will not disintegrate in a batter prepared from said mix under the usual conditions employed for preparing a batter.

2. A dry cookie mix comprising flour, shortening, sugar and discrete chocolate particles, the shortening being thoroughly smeared on the flour and the mix being impressed in the form of a solid block, the chocolate particles having a coating of sugar and a vegetable gum, which coating will not disintegrate in a batter prepared from said mix under the usual conditions employed for preparing a batter.

References Cited in the file of this patent

UNITED STATES PATENTS

| | | |
|---|---|---|
| Re. 23,484 | Johnson | Apr. 29, 1952 |
| 2,062,867 | Cosler | Dec. 1, 1936 |
| 2,353,307 | Joffe | July 11, 1944 |
| 2,496,678 | Salo et al. | Feb. 7, 1950 |
| 2,525,599 | Gustavson | Oct. 10, 1950 |
| 2,686,721 | Callaghan et al. | Aug. 17, 1954 |

OTHER REFERENCES

Jordan: "Confectionery Standards," 1933, published by Applied Sugar Laboratories, Inc. (N.Y.), pp. 298 and 299.

Given: "Modern Encyclopedia of Cooking," vol. 1, 1949, published by J. G. Ferguson and Assoc. (Chicago), page 684.